(12) United States Patent
Leite Rosa et al.

(10) Patent No.: US 12,313,434 B2
(45) Date of Patent: May 27, 2025

(54) FLOW SENSOR

(71) Applicant: J2M INDÚSTRIA E COMÉRCIO LTDA, Rio Grande do Sul (BR)

(72) Inventors: Alexandre Leite Rosa, Sao Paulo (BR); Rodrigo Tadeu De Oliveira Ladeira, Sao Paulo (BR); Ivanildo Batista Do Nascimento, Sao Paulo (BR); Gustavo Baldon Torquato, Sao Paulo (BR)

(73) Assignee: J2M INDÚSTRIA E COMÉRCIO LTDA, Rio Grande do Sul (BR)

( * ) Notice: Subject to any disclaimer, the term of this patent is extended or adjusted under 35 U.S.C. 154(b) by 242 days.

(21) Appl. No.: 17/998,190

(22) PCT Filed: May 7, 2021

(86) PCT No.: PCT/BR2021/050193
§ 371 (c)(1),
(2) Date: Nov. 8, 2022

(87) PCT Pub. No.: WO2021/223002
PCT Pub. Date: Nov. 11, 2021

(65) Prior Publication Data
US 2023/0104019 A1    Apr. 6, 2023

(30) Foreign Application Priority Data

May 8, 2020    (BR) ............................ 1020200091999

(51) Int. Cl.
G01F 1/66     (2022.01)
G01F 15/14    (2006.01)
G01F 15/18    (2006.01)

(52) U.S. Cl.
CPC .............. G01F 1/662 (2013.01); G01F 15/14 (2013.01); G01F 15/18 (2013.01)

(58) Field of Classification Search
CPC ........... G01F 1/662; G01F 15/14; G01F 15/18
USPC ....................................................... 73/861.18
See application file for complete search history.

(56) References Cited

U.S. PATENT DOCUMENTS 10,809,106 B2    10/2020   Stuyvenberg et al.
2016/0061640 A1*  3/2016   Joshi ........................ G01F 15/18
                                                              73/197
2017/0261397 A1    9/2017   Horne et al.

FOREIGN PATENT DOCUMENTS

DE    102016208292 A1 *  11/2016  ............. G01F 1/662
NO       2016032457 A1     3/2016
WO       2020247984 A1    12/2020

OTHER PUBLICATIONS

Translation of DE-102016208292-A1 (Year: 2016).*
International Search Report for Corresponding International Application No. PCT/BR2021/050193, 3 pages, Jul. 15, 2021.

* cited by examiner

Primary Examiner — Nathaniel T Woodward
(74) Attorney, Agent, or Firm — Heidi Eisenhut; LOZA & LOZA, LLP

(57) ABSTRACT

A flow sensor (1) of particulate solids, preferably aimed at monitoring the application of agricultural inputs in the soil, wherein it is installed externally to the input conductor, does not require contact with the input and transmits the data of monitoring in a wireless transmission. The sensor (1) in its preferred configuration has at least: a casing (1.1); a vibration transducer (1.3); an electronic board (1.4); and a battery (1.5).

8 Claims, 3 Drawing Sheets

FLOW SENSOR

CROSS-REFERENCE TO RELATED APPLICATIONS

This application is a 371 of PCT/BR2021/050193, filed May 7, 2021, which claims the benefit of Brazilian Application No. BR 1020200091999, filed May 8, 2020, both applications are incorporated herein by reference.

FIELD OF THE INVENTION

The present invention is inserted in the field of agriculture, more specifically in the field of sensing inputs in agricultural implements.

BACKGROUND OF THE INVENTION

Agricultural implements are equipment that perform various functions in the field, and one of the main performed functions is the application of inputs to the soil.

There are numerous possible causes for failures in these applications, from the absence of input in the storage tanks to the clogging of input conductors (hoses and tubes). The occurrence of failures in the application of inputs can cause catastrophic damages to the agricultural production that, in general, are discovered only after the plants emerge, when little can be done to reduce the losses.

Among the inputs used in agriculture, we can highlight those that are applied in the form of flows of particulate solids, such as fine grains (wheat, rice, barley, rye, etc.) and granulated chemical fertilizers (commonly called fertilizer). The transport of these inputs in the implements occurs mainly by gravity (mechanical implements) or by positive pressure generated by pneumatic turbines (pneumatic implements).

The sensing of inputs in these implements involves great engineering challenges that are imposed by the agricultural environment. An ideal sensing system should be able to overcome the fragility of solutions with wires and cables in the field, provide the robustness and ease of installation and use necessary in distant and remote areas of agribusiness, adapt to the peculiarities of the flow of solid inputs (fragility of grains, hygroscopicity of fertilizers, etc.), in addition to meeting a useful life expectancy typical of the agricultural environment, greater than 10 years.

The technologies applied in the sensing of inputs in agricultural implements date back to the 1960s and include: sensing by an optical emitter/receiver pair, by ultrasound, by microwave, with capacitive transducer, with piezoelectric transducer, by acoustic effect, among others. These technologies, over time, were employed in increasingly sophisticated ways, taking advantage of technological advances in the semiconductor industry.

A problem in agricultural implements is the use of wires and cables. The rate of failures resulting from mechanical damage to the cables and bad electrical contacts in the connectors is very high, especially in implements for the application of granulated fertilizer (a highly corrosive chemical compound).

Current market solutions depend on a specialized technician to install sensors on implements. Likewise, any preventive or corrective maintenance, where electronic components need to be replaced, also requires the presence of a technician. Due to the great distances involved in agribusiness, this need translates into long machine downtime and high service costs.

Another problem that is present in sensors available on the market is the need to change original components of the machine, whether cutting, drilling or replacing the hoses for transporting fertilizer and fine grains. These changes, in addition to being able to damage the implement, commonly impair the application of inputs.

The input sensors available on the market have another undesirable characteristic: the need for input contact with some part of the sensor. The peculiarity of agricultural inputs is such that a simple interference in the direction of flows can cause serious problems. For example, in seeds, sensors can cause mechanical damages that reduce their germination capacity and, in fertilizers, cause the effect of cementation, which is the adherence of the fertilizer to the walls of the conductor or sensor, generating total or partial obstruction of the flow.

STATE OF THE ART

Some documents of the state of the art present wireless flow sensors; however, they do not have the same features as the present invention.

Document BR 10 2015 025882-8, SENSOR DE FLUXO DE MATERIAL PARTICULADO SÓLIDO SEM FIO DOTADO DE BATERIA INTERNA, describes a sensor addressed preferably to the sensing of agricultural inputs to monitor the flow inside a conductor that guides the particulate material during the operation of agricultural machinery.

However, the sensor disclosed by such a document is installed in series with the input conductor, thus requiring a change in the original connections of the implement and contact between the input and some part of the sensor. These factors can impair the original performance of the implement, for example, by increasing fertilizer cementation in the sensor region and/or by the impact of seeds with the sensor. Further, when the diameters of the sensor and the conductors are different, there is a need to add adapter couplings between them, maximizing the aforementioned negative effects.

Document US20160143211, WIRELESS FLOW MONITORING SYSTEM FOR AN AIR SEEDER, presents a sensing system and a specific flow sensor for the type of input to be detected, wherein the sensors are coupled to the input pipes and transmit the information of the passage of inputs in a wireless transmission.

The sensor disclosed by such a document is also installed in series with the input conductor, and therefore suffers from the same problems as the aforementioned patent. In addition, the abovementioned document alleges that there is a lower energy consumption of the sensors because they only transmit information to neighboring sensors, requiring less power in data transmission. However, it is known that in this network topology the sensors consume more energy, due to the fact that they are constantly in reception mode.

BRIEF DESCRIPTION OF THE INVENTION

The present invention presents a flow sensor (1) of particulate solids preferably addressed to the monitoring of the application of agricultural inputs in the soil, wherein it does not require contact with the input, it is installed externally to the input conductor and transmits monitoring data wirelessly. The sensor (1) in its preferred configuration comprises at least: a casing (1.1; 1.2); a vibration transducer (1.3); an electronic board (1.4); and a battery (1.5).

BRIEF DESCRIPTION OF THE FIGURES

To obtain a full and complete view of the object of this invention, the figures to which references are made are presented, as follows.

DETAILED DESCRIPTION OF THE INVENTION

Figure 1:
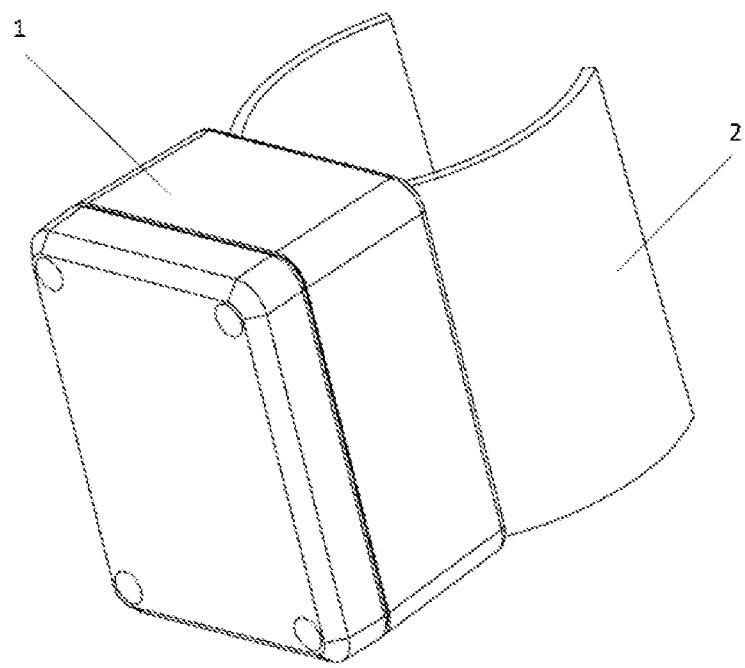
FIG. 1 shows an isometric view of the sensor (1) with side flaps (2), according to a preferred configuration of the present invention.

The present invention presents a flow sensor (1) of particulate solids preferably aimed at monitoring the application of agricultural inputs in the soil, where it does not require a contact with the input for proper monitoring of the same, which is installed externally to the flow conductor (4) and further transmits the monitoring data to a receiver in a wireless transmission. The sensor (1) comprises, in its preferred configuration, at least: a casing (1.1; 1.2); a vibration transducer (1.3); an electronic board (1.4); and a battery (1.5).

Figure 2:
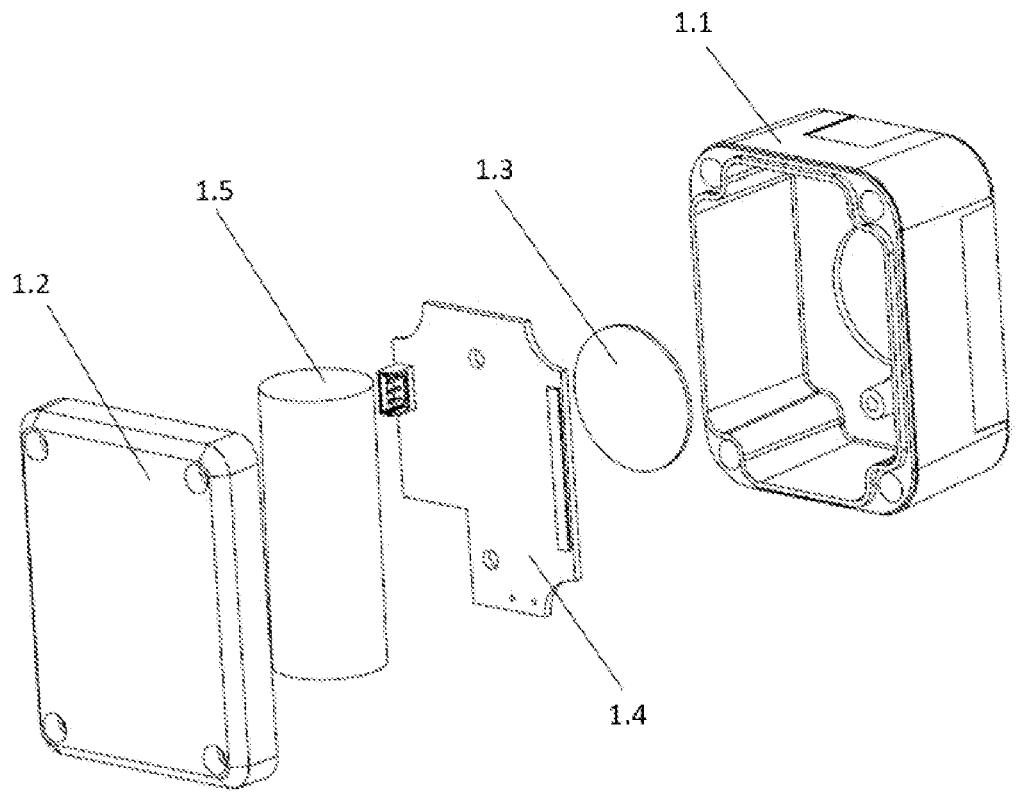
FIG. 2 shows the exploded view of the sensor (1), according to a preferred configuration of the present invention.

The casing (1.1; 1.2), as seen in FIG. 2, has the function of accommodating the other components of the sensor (1) inside, comprising a main body (1.1) and a cover (1.2), where the main body (1) has a recess on its lower face, preferably at its midpoint, for fitting the vibration transducer (1.3). The recess allows the transducer to be very close to the flow conductor without the need for a thin wall across the lower face of the sensor. The cover (1.2) makes up the upper face of the main body (1.1) closing and sealing the upper part of the same and preferably being fixed by screws at its ends.

The casing (1.1; 1.2) is preferably filled with epoxy resin, or an equivalent material, to make the sensor (1) more robust. However, in order not to impair the capture of mechanical stimuli by the transducer (1.3), it is necessary to insert a layer of foam, or an equivalent material, between the transducer (1.3) and the resin.

The vibration transducer (1.3) has the function of turning the mechanical stimuli, which the materials passing through the conductor (4) exert as a result of the collision of its particles against the inner side of the wall thereof, into electrical signals proportional to these stimuli. The transducer (1.3) is preferably a piezoelectric crystal positioned next to the recess on the lower face of the main body (1.1) of the casing, and therefore it has an indirect contact with the external side of the conductor wall (4), enabling the capture of mechanical stimuli.

Such stimuli and, consequently, the energy contained in the electrical signals captured therefrom are proportional to the flow of the material passing through the conductor (4), both in its amplitude and in its frequency, thus being an indirect measure of the flow.

The transducer, transmits the electrical signals to the electronic board (1.4).

Figure 5:
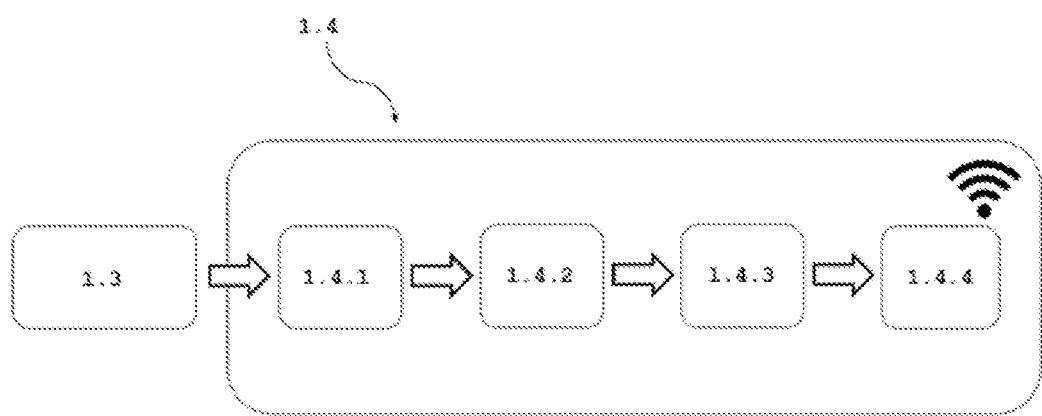
FIG. 5 shows a schematic diagram of the electronic board, according to a preferred configuration of the present invention.

The electronic board (1.4), as partially illustrated in FIG. 5, has a detector circuit (1.4.1), an analog circuit (1.4.2), a processor (1.4.3) and a radio frequency transceiver (1.4.4).

The detector circuit (1.4.1) has the function of identifying the existence, no matter how small, of the flow of materials passing through the conductor (4) detecting the presence of electrical signals from the transducer (1.3) and, with that, activating the other components of the electronic board (1.4) thus exercising the "Wake on Flow" function (waking up in the presence of flow).

The detector circuit (1.4.1) allows the other components of the electronic board (1.4) to remain off at times when there is no flow in the conductors (4), resulting in savings in battery consumption (1.5) and, consequently increasing the operating time autonomy of the sensor (1).

The analog circuit (1.4.2) has the function of filtering the electrical signal coming from the detector circuit (1.4.1) by eliminating the captured low frequency signals-typically caused by other sources and not by the passage of material inside the conductor (4), and provides the filtered electrical signal to the processor (1.4.3).

The passage of material through the conductor (4) generates a signal with high frequency components, higher than those generated by mechanical stimuli coming from the ends of the conductor (4), such as machine vibrations and impacts of the agricultural implement against the soil. With this, it is possible to obtain an electrical signal whose amplitude and frequency characteristics are mostly correlated with the intensity of the flow passing through the conductor (4).

The processor (1.4.3) receives the filtered signal from the analog circuit (1.4.2) and estimates the flow intensity as a function of the characteristics of the received electrical signal, accounting for the number of relevant impacts perceived by the sensor in a window of time and correlating it with the flow intensity from a previously produced data table. With this, the processor (1.4.3) provides the flow intensity information to the radio frequency transceiver (1.4.4).

The radio frequency transceiver (1.4.4) receives the flow intensity information from the processor (1.4.3) and transmits this information to a remote receiver, for example, an on-board computer on the tractor or a remote supervision system.

The battery (1.5) can be of the primary type (non-rechargeable) or the secondary type (rechargeable) and is responsible for powering the electronic board (1.4).

Figure 3:
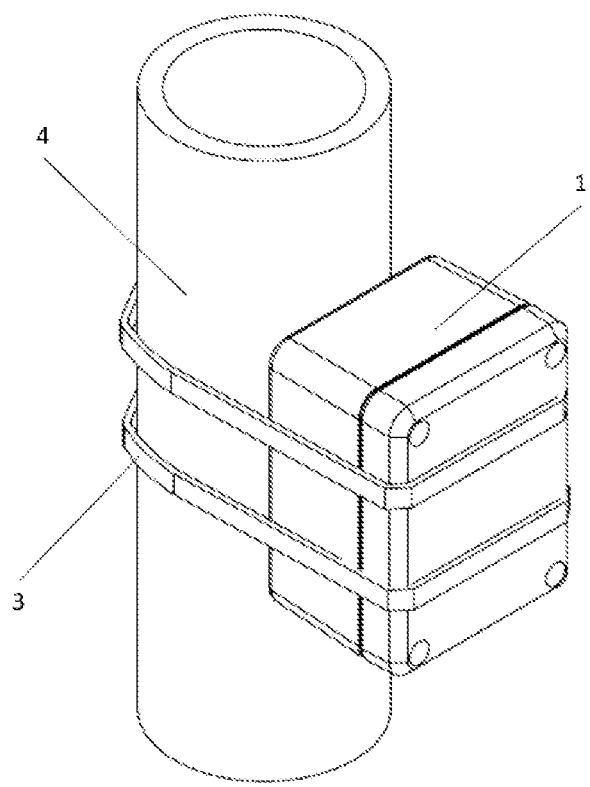
FIG. 3 shows the sensor (1) properly installed in a rigid conductor (4) with the aid of clamps (3), according to a preferred configuration of the present invention.

The configuration of the sensor (1) allows for easy installation and maintenance of the same in the flow conductors (4), especially the conductors of agricultural inputs used in implements in the field. In cases where the conductor is sufficiently rigid, the use of clamps (3) is recommended, as shown in FIG. 3.

Figure 4:
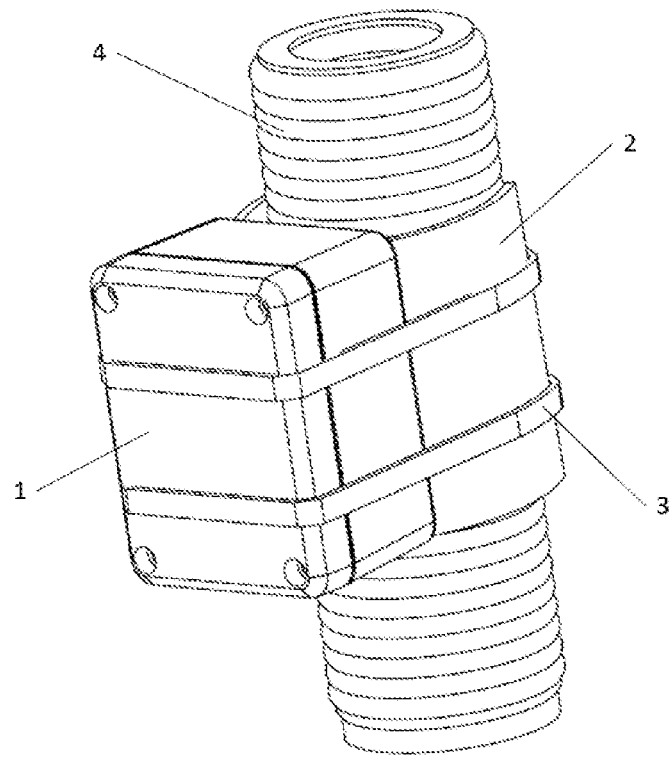
FIG. 4 shows the sensor (1) properly installed in a malleable conductor (4) with the aid of side flaps (2) and clamps (3), according to a preferred configuration of the present invention.

However, it is common in some agricultural implements to use flexible conductors, which are the cases of mechanical planters and seeders, as seen in FIG. 4. In these cases, fixing the sensor with clamps can cause deformations in the conductors, impairing the flow of inputs. This happens because the clamps (3) have little contact area with the conductors.

To remedy this problem of deformation in flexible conductors, the present invention further presents side flaps (2), as seen in FIGS. 2 and 4. Such side flaps (2) are made of semi-flexible material and have a large contact area with the conductor (4). With that, they can embrace it without causing throttling or deformation. Furthermore, even when installing the sensor in rigid conductors, the side flaps (2) provide greater stability to the installation, making it more robust and suitable for the agricultural environment.

Advantages of the Invention

The present invention has advantages over the state of the art, by solving recurrent problems contained in input flow sensors in agricultural implements, such as:

Easier installation, which can be done by the implement operator himself, saving high travel costs for installations and maintenance;

Maintenance of the originality of the implement, through a clean installation, without any alteration of the original components of the machine, thus maintaining its characteristics of efficiency in the application of the inputs;

Total absence of wires, which significantly increases the robustness of the product, resulting in shorter maintenance times and machine downtime;

Sensing without contact with the input, so as not to cause mechanical damage to the seeds, which reduce their germination rate, nor cause cementing problems in fertilizers; and Operating most of the time in operating mode with low power consumption, with the transceiver turned off, entering transmission mode only in case of an event (lack of flow).

Those skilled in the art will value the knowledge presented herein and will be able to reproduce the invention in the presented embodiments and in other variants encompassed by the scope of the appended claims.

The invention claimed is:

1. A flow sensor of particulate solids for monitoring the application of agricultural inputs in soil, said flow sensor installed externally to a flow conductor and configured to transmit sensing data in a wireless transmission, wherein said flow sensor comprises:
a casing;
a vibration transducer;
an electronic board; and
a battery,
wherein the casing accommodates other components of the flow sensor inside comprises a main body and a cover,
wherein the main body has a recess on a lower face, at a midpoint of the lower face, for fitting the vibration transducer so that the vibration transducer is in indirect contact with the flow conductor; and
wherein the cover makes up an upper face of the main body closing and sealing the main body and wherein the upper face is fixed by screws at its ends; and is optionally filled with resin, separated from the vibration transducer by a foam.

2. The flow sensor according to claim 1, wherein the vibration transducer is configured to transform mechanical stimuli received by the flow conductor into electrical signals proportional to said mechanical stimuli, and wherein the vibration transducer optionally is a piezoelectric crystal positioned next to a recess on the lower face of the main body of the casing and configured to transmit the electrical signals to the electronic board.

3. The flow sensor according to claim 1, wherein the electronic board comprises a detector circuit, an analog circuit, a processor and a radio frequency transceiver.

4. The flow sensor according to claim 3, wherein the detector circuit is configured to detect the presence of electrical signals from the transducer and to activate the other components of the electronic board.

5. The flow sensor according to claim 3, wherein the analog circuit is configured to filter the electrical signals coming from the detector circuit and to provide the processor with filtered electrical signals.

6. The flow sensor according to claim 3, wherein the processor is configured to receive the filtered signal from the analog circuit, to estimate the flow intensity as a function of the characteristics of the received electrical signals, and to supply the flow intensity information to the radio frequency transceiver.

7. The flow sensor according to claim 3, wherein the radio frequency transceiver is configured to receive flow intensity information from the processor and to transmit the flow intensity information to a remote receiver.

8. The flow sensor according to claim 1, further comprising side flaps, wherein said side flaps are made of a semi-flexible material and have a large contact area with the conductor.

* * * * *